US009073096B2

(12) United States Patent
Ehman

(10) Patent No.: US 9,073,096 B2
(45) Date of Patent: Jul. 7, 2015

(54) APPARATUS, SYSTEM, AND METHOD FOR RETAINING SOLVENT

(76) Inventor: Martin D. Ehman, Bountiful, UT (US)

( * ) Notice: Subject to any disclaimer, the term of this patent is extended or adjusted under 35 U.S.C. 154(b) by 989 days.

(21) Appl. No.: 13/096,810

(22) Filed: Apr. 28, 2011

(65) Prior Publication Data

US 2011/0266190 A1 Nov. 3, 2011

Related U.S. Application Data

(60) Provisional application No. 61/329,010, filed on Apr. 28, 2010, provisional application No. 61/378,040, filed on Aug. 30, 2010, provisional application No. 61/452,985, filed on Mar. 15, 2011.

(51) Int. Cl.
*A47J 47/20* (2006.01)
*B08B 3/00* (2006.01)

(52) U.S. Cl.
CPC ........... *B08B 3/006* (2013.01); *Y10T 29/49826* (2015.01); *Y10T 24/44598* (2015.01); *Y10T 24/44974* (2015.01)

(58) Field of Classification Search
CPC .............. B08B 3/006; Y10T 24/44598; Y10T 24/44974; E03C 1/326; E03C 1/182
USPC ........ 4/619, 625, 626, 631, 637, 565; 24/525, 24/569; 248/229.15, 229.25, 228.6, 230.6, 248/231.71
See application file for complete search history.

(56) References Cited

U.S. PATENT DOCUMENTS 371,408 A * 10/1887 Becker ......................... 248/27.5
2,590,793 A * 3/1952 Rigstad ...................... 211/88.01
2,605,136 A * 7/1952 Kline et al. ................... 239/282
2,659,491 A * 11/1953 Williams ............... 211/119.011
D205,833 S * 9/1966 Gardner ......................... D32/56
3,491,820 A * 1/1970 Ostling ........................ 52/796.1
3,522,814 A * 8/1970 Olson ........................... 134/111
3,535,751 A * 10/1970 Batchelor ..................... 403/395
3,594,830 A * 7/1971 Clifton .............................. 4/625
3,890,988 A * 6/1975 Lee ............................... 134/111
4,056,114 A * 11/1977 Boutillette ................. 134/104.4
4,462,415 A * 7/1984 Otzen ........................... 134/111
4,464,256 A * 8/1984 Plourde ......................... 210/149
4,480,343 A * 11/1984 Drach ............................... 4/656
4,589,150 A * 5/1986 Sciabarassi ........................ 4/656
D288,374 S * 2/1987 Ikeda ............................. D32/56
4,717,102 A * 1/1988 Pflieger ...................... 248/228.1
4,817,649 A * 4/1989 Schmalz et al. ............ 134/58 R
5,277,209 A * 1/1994 Olson ............................. 134/88
5,414,880 A * 5/1995 Drath ................................ 4/641
5,513,667 A * 5/1996 Usher ........................... 134/111
D383,056 S * 9/1997 Murakami ..................... D8/396
D396,913 S * 8/1998 Forbrich ........................ D32/56
D418,956 S * 1/2000 Hampshire .................... D32/56
6,016,818 A * 1/2000 Evaro et al. ................. 134/56 R
6,427,259 B1 * 8/2002 Cawthon ........................... 4/650
2009/0139023 A1 * 6/2009 Talerico ............................ 4/654

* cited by examiner

*Primary Examiner* — Lauren Crane
*Assistant Examiner* — Erin Deery
(74) *Attorney, Agent, or Firm* — Kunzler Law Group, PC

(57) ABSTRACT

An apparatus, system, and method are disclosed for retaining solvent. A tray surface extends outward from a solvent sink. The tray surface is inclined toward the solvent sink. One or more tray walls are disposed at a perimeter of the tray surface. The one or more tray walls extend upward from the tray surface. A tray attachment interface supports the tray surface and the one or more tray walls relative to the solvent sink.

20 Claims, 14 Drawing Sheets

APPARATUS, SYSTEM, AND METHOD FOR RETAINING SOLVENT

CROSS-REFERENCES TO RELATED APPLICATIONS

This application claims priority to U.S. Provisional Patent Application No. 61/329,010 entitled "APPARATUS, SYSTEM, AND METHOD FOR RETAINING SOLVENT" and filed on Apr. 28, 2010 for Martin D. Ehman, to U.S. Provisional Patent Application No. 61/378,040 entitled "APPARATUS, SYSTEM, AND METHOD FOR RETAINING SOLVENT" and filed on Aug. 30, 2010 for Martin D. Ehman, and to U.S. Provisional Patent Application No. 61/452,985 entitled "APPARATUS, SYSTEM, AND METHOD FOR STABILIZING A SOLVENT SINK" and filed on Mar. 15, 2011 for Martin D. Ehman, each of which are incorporated herein by reference.

FIELD

This invention relates to solvents and more particularly relates to solvent cleaners.

BACKGROUND

A solvent is a material, usually a liquid, that dissolves another material. Solvents have many uses across various industries, and are often used for cleaning. Industries involving machinery or other equipment that become dirty and soiled often use solvents to effectively clean the machinery or other equipment. Some types of solvents even lubricate the objects that they are cleaning. Cleaning with solvents is especially prevalent in the automotive and heavy equipment industries. This is often done in a tank-sink type solvent cleaner common in the field, in which the solvent is stored in a tank, pumped into a tube, and dispersed through a nozzle or brush to clean an object placed in a sink disposed atop the tank. Generally the objects are transported from a work bench for cleaning, then, after cleaning, are again transferred to the work bench.

Once the objects are clean, however, they can drip solvent on the arms of those holding and moving the clean objects and on other surrounding objects. This wastes solvent that could otherwise be reused to clean other objects. Further, many solvents are flammable, emit dangerous vapors, can cause sores and wounds on the skin, or can be absorbed through the skin to cause other health problems, such as liver, kidney, or brain damage. Allowing solvent to drip on people and on other surrounding objects can be inefficient and dangerous.

Additionally, even the larger sinks have limitations of space, requiring that objects to be cleaned be frequently transported, usually after cleaning, while still wet and dripping.

SUMMARY

From the foregoing discussion, it should be apparent that a need exists for an apparatus, system, and method that retain solvent. Beneficially, such an apparatus, system, and method would preserve solvent for reuse and protect users and surrounding objects from dripping solvent.

The present invention has been developed in response to the present state of the art, and in particular, in response to the problems and needs in the art that have not yet been fully solved by currently available solvent cleaning systems. Accordingly, the present invention has been developed to provide an apparatus, system, and method for retaining solvent that overcome many or all of the above-discussed shortcomings in the art.

The apparatus to retain solvent, in one embodiment, includes a tray surface, one or more tray walls, and a tray attachment interface. In further embodiments, the apparatus to retain solvent includes a lip, one or more support arms, one or more shelf openings, lip interface material, support arm interface material, an elongate trough, and/or a drain.

In one embodiment, the tray surface is formed to extend outward from a solvent sink. The tray surface, in a further embodiment, is inclined toward the solvent sink. The one or more tray walls, in one embodiment, are disposed at a perimeter of the tray surface. In another embodiment, the one or more tray walls extend upward from the tray surface.

In one embodiment, the tray attachment interface is formed to support the tray surface and the one or more tray walls relative to a solvent sink. The tray attachment interface, in certain embodiments, includes a lip and one or more support arms. In one embodiment, the lip is formed to extend from the tray surface into the solvent sink along an inner surface of the solvent sink. The one or more support arms, in a further embodiment, extend downward from the tray surface and are formed to abut an outer surface of the solvent sink. In certain embodiments, the tray surface, the one or more tray walls, and the lip are integrally formed from a single continuous piece of material, such as a single sheet of metal or the like.

In one embodiment, lip and the one or more support arms form the one or more shelf openings. The one or more shelf openings, in another embodiment, are disposed between the lip and the one or more support arms. The one or more shelf openings, in a further embodiment, provide space for an upper edge of the solvent sink.

In certain embodiment, the tray attachment interface includes lip interface material and support arm interface material. The lip interface material, in one embodiment, is disposed between the lip and the inner surface of the solvent sink. The support arm interface material, in one embodiment, is disposed between the one or more support arms and the outer surface of the solvent sink. The lip interface material and the support arm interface material, in a further embodiment, are each formed of padding material that provides friction between the tray attachment interface and the solvent sink.

In one embodiment, the elongate trough is disposed in the tray surface along an edge of the tray surface adjacent to the solvent sink. The elongate trough, in a further embodiment, is shaped to receive a flange extending from a lid of the solvent sink, so that the tray surface does not prevent the lid from fully closing over the solvent sink. The elongate trough, in one embodiment, includes a drain. The drain of the elongate trough, in certain embodiments, is in fluid communication with the solvent sink and/or a solvent tank.

A system of the present invention is also presented to retain solvent. The system may be embodied by a solvent tank, a solvent sink in fluid communication with the solvent tank, and one or more solvent retention shelves. The system, in various embodiments, may include a drain, a solvent pump, one or more solvent hoses, a solvent filter, and a lid.

Each solvent retention shelf, in certain embodiments, is substantially similar to the apparatus to retain solvent described above. In one embodiment, the one or more solvent retention shelves are removable from the solvent sink and are installable in a plurality of positions around the solvent sink.

In one embodiment, the drain is disposed within the solvent sink. The drain, in a further embodiment, is in fluid communication with the solvent tank. Solvent from the one or more solvent retention shelves, in certain embodiments, runs from the one or more solvent retention shelves into the solvent sink, through the drain, and into the solvent tank.

In one embodiment, the solvent pump delivers solvent from the solvent tank to the solvent sink through one or more solvent hoses. The solvent filter, in certain embodiments, is between the solvent tank and the solvent pump. The solvent filter, in one embodiment, removes contaminants from the solvent that the solvent pump delivers from the solvent tank to the solvent sink.

In one embodiment, the lid of the solvent sink is supported in an open position by a fusible material. The fusible material, in a further embodiment, melts to close the lid in response to a fire in the solvent sink. In another embodiment, the lid of the solvent sink includes a flange extending from the lid.

A method of the present invention is also presented for forming a solvent retention shelf. The method in the disclosed embodiments substantially includes the steps for forming the described apparatus. In one embodiment, the method includes forming one or more tray walls at a perimeter of a tray surface, the tray walls extending upward from the tray surface. The method, in another embodiment, includes forming a lip on the tray surface, the lip extending downward from the tray surface on one edge of the tray surface. In a further embodiment, the method includes attaching one or more support arms to the tray surface, the one or more support arms extending downward from the tray surface, the lip and the one or more support arms forming one or more shelf openings.

In one embodiment, the method includes placing the one or more shelf openings over an upper edge of a solvent sink. The method, in a further embodiment, includes interfacing the lip with an inner surface of the solvent sink. In another embodiment, the method includes interfacing the one or more support arms with an outer surface of the solvent sink such that the tray surface extends outward from the solvent sink and the tray surface is inclined toward the solvent sink. In certain embodiments, the lip and the one or more support arms support the tray surface and the one or more tray walls relative to the solvent sink.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
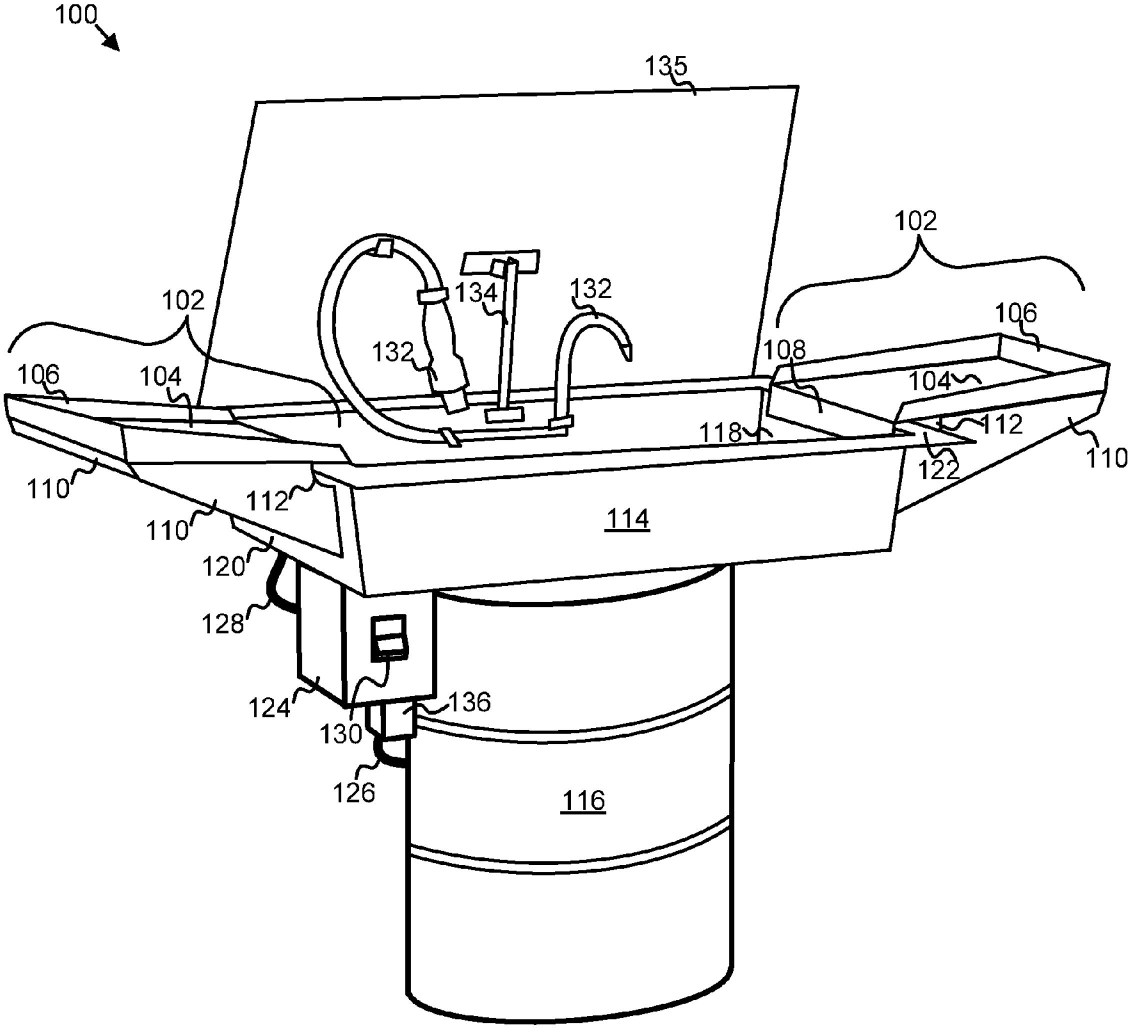
FIG. 1 is a perspective view illustrating one embodiment of a system for retaining solvent in accordance with the present invention.

FIG. 1 is a perspective view depicting one embodiment of a solvent cleaning system 100. The system 100, in the depicted embodiment, includes a solvent sink 114 with two solvent retention shelves 102 and a solvent tank 116. The solvent retention shelves 102 provide a surface upon which a user of the solvent sink 114 may place items that the user has cleaned in the solvent sink 114, allowing the solvent retention shelves 102 to drain excess solvent back into the solvent sink 114 and/or the solvent tank 116. The solvent retention shelves 102 may conserve solvent and/or prevent solvent from dripping outside of the solvent sink 114.

In general, the solvent sink 114 provides a stream of solvent from the solvent tank 116 to clean and rinse soiled objects and returns used solvent to the solvent tank 116. The solvent sink 114, in the depicted embodiment, includes an inner surface 118, an outer surface 120, an upper edge 122, a solvent pump 124, solvent hoses 132, and a safety system 134.

The solvent sink 114, in one embodiment, is formed of a durable material, such as a metal, a ceramic, or the like. For example, the solvent sink 114 may be formed of stainless steel, cast iron, aluminum, porcelain, fiberglass, a composite of multiple materials, or of another durable material that can withstand contact with various solvents and provide support for mechanical parts and other equipment that may be cleaned in the solvent sink 114. Depending on the type of solvent used in the solvent sink 114, in certain embodiments other materials, such as plastics, may be used. The solvent sink 114 and/or portions of the solvent sink 114, in a further embodiment, may include various layers, treatments, or coatings to increase the durability of the solvent sink 114. For example, the solvent sink 114 may be coated with enamel, epoxy, or another finish.

The inner surface 118 of the solvent sink 114 forms a basin that receives the stream of solvent and returns the solvent to the solvent tank 116 through a drain or other opening (not shown) in a base of the inner surface 118. The inner surface 118 may also provide support for items that a user places in the solvent sink 114 for cleaning. In the depicted embodiment, the inner surface 118 and the outer surface 120 provide support for the solvent retention shelves 102. The inner surface 118 and the outer surface 120, in the depicted embodiment, are opposite faces of an exterior wall of the solvent sink 114. The inner surface 118 and the outer surface 120 have an upper edge 122 over which the solvent retention shelf 102 is placed. The upper edge 122 may include a lip, a rim, or the like that substantially circumscribes the solvent sink 114.

The solvent sink 114, in one embodiment, has a specific size to fit objects for cleaning. In one embodiment, the solvent sink 114 and solvent tank 116 assembly have a height of about 63 inches with the lid 135 open, a width front to back of about 34½ inches, a length left to right of about 26½ inches, an inside height within the solvent sink 114 of about 7½ inches, an inside width front to back within the solvent sink 114 of about 32 inches, and an inside length left to right within the solvent sink 114 of about 24 inches.

The solvent pump 124 is an electrical and/or mechanical pump that delivers solvent from the solvent tank 116 to the solvent sink 114. In the depicted embodiment, the solvent pump 124 is disposed on an underside of the solvent sink 114. In further embodiments, the solvent pump 124 may be disposed within the solvent tank 116 or elsewhere in the system 100. The solvent pump 124, as depicted, includes an electrical switch 130 to control operation of the solvent pump 124. In a further embodiment, the solvent pump 124 may be manually actuated, and may include a handle to an actuator which a user can manually handle to pump the solvent into the solvent sink 114.

In the depicted embodiment, the solvent pump 124 includes a solvent intake 126 that is in fluid communication with the solvent tank 116 and a solvent output 128 that is in fluid communication with the solvent sink 114. The solvent intake 126 and the solvent output 128 may include pipes, hoses, tubes, and the like. In one embodiment, the system 100 may include a filter 136 between the solvent tank 116 and the solvent pump 124 and/or between the solvent sink 114 and the solvent tank 116 to filter contaminants from the solvent.

The solvent tank 116 is the source of solvent for the solvent sink 114. The solvent tank 116, in the depicted embodiment, includes a drum or barrel. For example, the solvent tank 116, in one embodiment, is a galvanized drawn steel tank. In other embodiments, the solvent tank 116 may include another type of tank that stores a solvent. The solvent tank 116 may be sized to store a specific amount of solvent, such as sixteen gallons, twenty gallons, thirty gallons, and the like.

The solvent that the solvent tank 116 stores, in one embodiment, is an industrial solvent used for cleaning. The solvent may include one or more solvents such as alcohol solvents, amide solvents, amine solvents, deuterated solvents, ester solvents, ether solvents, glycol ethers, halogenated solvents, hydrocarbon solvents, inorganic solvents, ionic liquids, ketone solvents, nitro solvents, and the like. One of skill in the art, in view of this disclosure, will recognize other types of solvents suitable for use with the solvent sink 114.

The solvent pump 124 pumps the solvent through the solvent output 128 to the solvent hoses 132. In the depicted embodiment, the solvent hoses 132 include two flex hoses, one with a nozzle attachment and the other with a flow-through brush attachment. One of skill in the art, in view of this disclosure, will recognize that other embodiments of the solvent sink 114 may include a single solvent hose 132, additional solvent hoses 132, different types of hose attachments, and/or other arrangements of solvent hoses 132 for cleaning objects with solvent.

The safety system 134 provides one or more safety features for the solvent sink 114. Because many solvents are highly flammable, in the depicted embodiment, the safety system 134 includes a lid that is supported by a fusible material that melts in case of fire to close the lid and suppress the fire. In a further embodiment, the safety system 134 may include a fume hood to remove solvent vapors from the air to prevent inhalation of the vapors, ignition or explosion of the vapors, or other harmful effects caused by the vapors in the air.

The solvent retention shelves 102, in the depicted embodiment, each include a tray surface 104, tray walls 106, a lip 108, support arms 110, and shelf openings 112. While the depicted embodiment includes two solvent retention shelves 102 disposed on opposite sides of the solvent sink 114, other embodiments may include a single solvent retention shelf 102, one or more solvent retention shelves 102 on a front or back side of the solvent sink 114, or the like.

In the depicted embodiment the solvent retention shelves 102 are removable, and may be rearranged and placed at different locations along the upper edge 122 of the solvent sink 114. In a further embodiment, one or more solvent retention shelves 102 may be fixedly attached to the solvent sink 114. For example, a solvent retention shelf 102 may be welded, bolted, integrated with, or otherwise fixedly attached to the solvent sink 114. Accordingly, in the depicted embodiment, the solvent retention shelves 102 each include a removable tray attachment interface comprising a lip 108, support arms 110, and shelf openings 112. In other embodiments, a solvent retention shelf 102 may include a fixed tray attachment interface with welds, bolts, or the like as described below with regard to the solvent retention shelf connectors 304 of FIG. 3B.

The solvent retention shelves 102 retain used solvent by directing the used solvent back into the solvent sink 114 and/or into the solvent tank 116. Instead of storing recently cleaned items elsewhere, where solvent may drip and run onto other objects, wasting solvent and potentially causing damage, the solvent retention shelves 102 provide a surface directly adjacent to the solvent sink 114 for placing cleaned items. A user of the solvent sink 114 may clean an item in solvent in the solvent sink 114, place the item on a solvent retention shelf 102, and the solvent retention shelf 102 returns remaining used solvent from the item to the solvent sink 114 and/or to the solvent tank 116.

In the depicted embodiment, the solvent retention shelves 102 channel or drain used solvent back into the solvent sink 114, where a drain or other opening (not shown) returns the used solvent to the solvent tank 116. In a further embodiment, the solvent retention shelves 102 may drain used solvent directly into the solvent tank 116, through an auxiliary opening, or the like, in the solvent tank 116.

In one embodiment, a user may use both solvent retention shelves 102 for holding clean items. In another embodiment, a user may use one solvent retention shelf 102 to hold dirty items, may clean the items, and may place the clean items on the other solvent retention shelf 102, or the like. A user may also use the solvent retention shelves 102 to hold cleaning tools, supplies, or other items.

The solvent retention shelves 102 may be formed of one or more durable materials, similar to those described above with regard to the solvent sink 114. In one embodiment, the solvent retention shelves 102 may be formed of a metal such as aluminum, stainless steel, or the like. In another embodiment, depending on the type of solvents used, the solvent retention shelves 102 may be formed of a plastic material. In a further embodiment, different parts of the solvent retention shelves 102 may be formed of different materials.

In the depicted embodiment, the solvent retention shelves 102 each include a tray surface 104 for supporting items and directing solvent toward the solvent sink 114 and/or the solvent tank 116. The tray surface 104, in the depicted embodiment, is substantially flat. In further embodiments, the tray surface 104 may be rounded, may include one or more solvent channels for directing used solvent toward the solvent sink 114, may include a drain or other opening that is in fluid communication with the solvent tank 116, or the like.

The tray surface 104 of each solvent retention shelf 102, in the depicted embodiment, is inclined toward the solvent sink 114 to return the solvent to the solvent sink 114 and/or the solvent tank 116. In one embodiment, the incline angle of the tray surface 104 is about six degrees. The incline angle, in another embodiment, is between about five degrees and ten degrees. In a further embodiment, the incline angle may be between about one degree and thirty degrees. In a different embodiment where the solvent retention shelves 102 include a drain that returns solvent directly to the solvent tank 116, the tray surfaces 104 may be inclined toward the drain instead of or in addition to being inclined toward the solvent sink 114.

In the depicted embodiment, the tray walls 106 are disposed at a perimeter of the tray surface 104, extending upward from the tray surface 104. The three sides of the tray surfaces 104 that do not face the solvent sink 114, in the depicted embodiment, are surrounded by the tray walls 106. In one embodiment, the tray walls 106 retain solvent within the solvent trays 102 and channel the solvent toward the solvent sink 114 and/or the solvent tank 116. In a further embodiment, the tray walls 106 prevent items placed on the solvent retention shelves 102 from falling off of the solvent retention shelves 102.

The tray walls 106 of a solvent tray 102 may be formed with the tray surface 104 of the solvent tray, or may be attached to the tray surface 104 subsequent to formation. For example, in one embodiment, tray walls 106 and a tray surface 104 may be formed from a single, continuous sheet of metal, with the tray walls 106 bent along edges of the tray surface 104. In another embodiment, tray walls 106 may be welded, bolted, or otherwise attached to the tray surface 104.

The tray walls 106 of a solvent retention shelf 102 may be attached to each other, to prevent solvent from leaking out at intersections between them, or the like. For example, the tray walls 106 of a solvent retention shelf 102 may be formed of a continuous piece of material, corners at intersections of the tray walls 106 may be fillet welded, or tray walls 106 may be otherwise attached at intersections between adjacent tray walls 106.

The solvent retention shelves 102, in the depicted embodiment, each include a lip 108. The lip 108 interfaces with the inner surface 118 of the solvent sink 114 to deliver solvent from the tray surface 104 into the solvent sink 114. The lip 108 is formed on a side of the solvent retention shelves 102 that is toward the solvent sink 114 and adjacent to the solvent sink 114. The lip 108 may be integrally formed with the tray surface 104, for example by bending an edge of the tray surface 104, or may be otherwise attached to the tray surface 104, for example by welding or bolting the lip 108 to the tray surface 104.

In the depicted embodiment, the solvent retention shelves 102 do not include a tray wall 106 on the sides with the lips 108. In a further embodiment, a solvent retention shelf 102 may include a tray wall 106 on the side with the lip 108, and the tray wall 106 may include one or more drain openings through which solvent may drain through the tray wall 106, over the lip 108, and into the solvent sink 114. A tray wall 106 with one or more drain openings, in one embodiment, retains items on the solvent retention shelf 102 while allowing solvent to pass off of the solvent retention shelf 102 and into the solvent sink 114.

The solvent retention shelves 102, in the depicted embodiment, each include two support arms 110. The support arms 110 interface with the outer surface 120 to support the tray surface 104. The support arms 110 of a solvent retention shelf 102, in one embodiment, are integrally formed with the tray surface 104 and/or with the tray walls 106. In a further embodiment, the support arms 110 of a solvent retention shelf 102 are attached to the tray surface 104 by welds, bolts, screws, and/or other connectors.

Each support arm 110, in one embodiment, includes a support arm face (not shown) abutting the outer surface 120.

The lip 108 and the support arms 110, in addition to providing structural support for the tray surface 104, orient and position the tray surface 104 relative to the solvent sink 114. The size, angles, and positions of the lip 108 and the support arms 110 determine the incline angle of the tray surface 104, and may be selected to provide a desired incline angle.

The lip 108 and the support arms 110 form one or more shelf openings 112. The shelf openings 112 provide space for the upper edge 122 of the solvent sink 114, with any corresponding lip or rim around the upper edge 122. In the depicted embodiment, to install a solvent retention shelf 102 on the solvent sink 114, a user places the shelf opening 112 over the upper edge 122 of the solvent sink 114, positioning the upper edge 122 within the shelf opening 112. The user lowers the solvent retention shelf 102 until the lower surface of the tray surface 104 contacts the upper edge 122 of the solvent sink 122 and the lip 108 interface with the inner surface 118 of the solvent sink 122. The user rotates the solvent retention shelf 102 downward until the support arms 110 interface with the outer surface 120 of the solvent sink 114.

By interfacing with the inner surface 118 and the outer surface 120 of the solvent sink 114, the lip 108 and the support arms 110 cooperate to support the solvent retention shelf 102. In the depicted embodiment, downward pressure on the solvent retention shelf 102 increases pressure between the lip 108 and the inner surface 118 of the solvent sink 114 and between the support arms 110 and the outer surface 120 of the solvent sink 114, supporting the solvent retention shelf 102.

Figure 2:
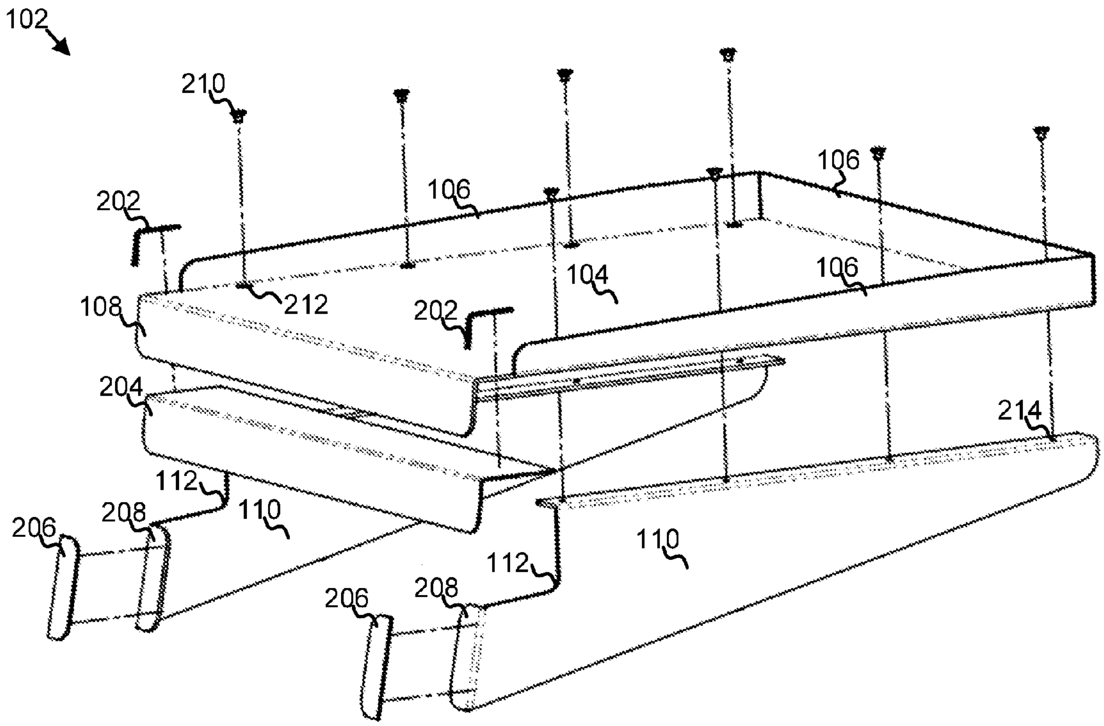
FIG. 2 is an exploded view illustrating one embodiment of a solvent retention shelf in accordance with the present invention.

FIG. 2 is an exploded view depicting one embodiment of the solvent retention shelf 102. In the depicted embodiment, the solvent retention shelf 102 is substantially similar to the solvent retention shelves 102 depicted in FIG. 1. The solvent retention shelf 102 includes the tray surface 104, the tray walls 106, the lip 108, the support arms 110, and the shelf openings 112 and further includes solvent guides 202, lip interface material 204, support arm interface material 206, support arm faces 208, connectors 210, tray connector interfaces 212, and support arm connector interfaces 214.

In the depicted embodiment, the tray surface 104, the tray walls 106, and the lip 108 are each formed from a single, continuous sheet of metal, with the tray walls 106 bent up along three edges of the tray surface 104 and the lip 108 bent down along a fourth edge of the tray surface 104. In the depicted embodiment the support arms 110 are formed separately from the tray surface 104. In one embodiment, the tray surface 104, the tray walls 106, the lip 108, and/or the support arms 110 are formed from a sheet of aluminum. In a further embodiment, the tray surface 104, the tray walls 106, the lip 108, and/or the support arms 110 are formed from a 10 gauge sheet of metal that is about 0.09 inches thick.

The solvent retention shelf 102 may be sized to fit a specific size or design of solvent sink 114. In one embodiment, the solvent retention shelf 102 has dimensions of about 18½ inches front to back, about 19 inches left to right, and about 6 inches high. One of skill in the art, in light of this disclosure, will recognize other dimensions for a solvent retention shelf 102 to fit various sizes and designs of solvent sinks 114.

The connectors 210 connect the support arms 110 to the tray surface 104 by interfacing with the tray connector interfaces 212 and the support arm connector interfaces 214. In the depicted embodiment, the connectors 210 are cap screws and the connector interfaces 212, 214 are threaded holes. The connectors 210, cap screws in the depicted embodiment, may be counter sunk into the tray connector interfaces 212 such that the connectors 210 are flush with the tray surface 104. In further embodiments, the connectors 210 may include bolts, welds, glue, and/or other types of connectors.

The depicted embodiment includes solvent guides 202 that prevent solvent from dripping off of an edge of the tray surface 104 and/or the lip 108. The solvent guides 202, in the depicted embodiment, are disposed along an edge of the tray surface 104 and the lip 108 at an intersection of the tray surface 104 and the lip 108. In a further embodiment, the solvent guides 202 may be disposed along an edge of the tray surface 104 or the lip 108 without extending along an edge of the other. The solvent guides 202, in one embodiment, are formed of a durable material, such as metal, plastic, rubber, or the like.

In the depicted embodiment, the solvent guides 202 are separate from and attached to the tray surface 104 and the lip 108 using an adhesive, welding, or the like. In a further embodiment, the solvent guides 202 may be integrally formed with the tray surface 104 and/or the lip 108. For example, the solvent guides 202 may include a raised bump in the tray surface 104 and/or the lip 108, a wall formed by bending an edge of the tray surface 104 and/or the lip 108, or the like. In one embodiment, the solvent guides 202 are an extension of the tray walls 106.

The depicted embodiment further includes lip interface material 204 and support arm interface material 206. The lip interface material 204 and the support arm interface material 206, in one embodiment, are placed at locations where the solvent retention shelf 102 interfaces with the solvent sink 114 to prevent the solvent retention shelf 102 from damaging the solvent sink 114 and to prevent movement of the solvent retention shelf 102 while installed on the solvent sink 114. The lip interface material 204 and the support arm interface material 206 may be formed of rubber, plastic, foam, fabric, leather, or another material that provides padding and/or friction between the solvent retention shelf 102 and the solvent sink 114.

In the depicted embodiment, the lip interface material 204 is disposed on an underside of the lip 108 and on at least a portion of the tray surface 104 adjacent to the lip 108. When the solvent retention shelf 102 is installed on the solvent sink 114, the lip interface material 204 is disposed between the lip 108 and the inner surface 118 of the solvent sink 114 and between the tray surface 104 and the upper edge 122 of the solvent sink 114. In other embodiments, the lip interface material 204 may be disposed on the lip 108 but not on the tray surface 104, or vice versa.

The support arm interface material 206, in the depicted embodiment, is disposed on the support arm faces 208. The support arm faces 208 are disposed at an end of the support arms 110 toward the solvent sink 114 for abutting the outer surface 120 of the solvent sink 114. The support arm interface material 206 is disposed between the support arm faces 208 and the outer surface 120 of the solvent sink 114 when the solvent retention shelf 102 is installed on the solvent sink 114.

Figure 3A:
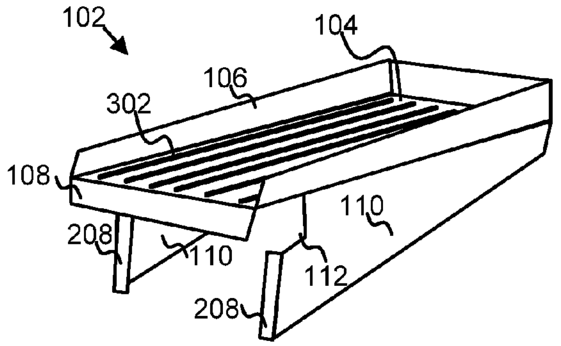
FIG. 3A is a perspective view illustrating another embodiment of a solvent retention shelf in accordance with the present invention.

FIG. 3A is a perspective view depicting another embodiment of the solvent retention shelf 102. In the depicted embodiment, the solvent retention shelf 102 is substantially similar to the solvent retention shelves 102 of FIG. 1 and the solvent retention self 102 of FIG. 2. The solvent retention shelf 102 includes the tray surface 104, the tray walls 106, the lip 108, the support arms 110, the shelf openings 112, and the support arm faces 208 and further includes solvent channels 302.

The solvent channels 302 channel solvent along the tray surface 104 toward the lip 108. The solvent channels 302 may be integrally formed with the tray surface 104, such as bumps formed in the surface of the tray surface 104 using a die or the like, or the solvent channels 302 may be affixed to the tray surface 104. The solvent channels 302 may be formed of metal, rubber, plastic, or another durable material. In one embodiment, the solvent channels 302 further provide friction to prevent items from sliding down the tray surface 104 while allowing solvent to flow down the tray surface 104.

Figure 3B:
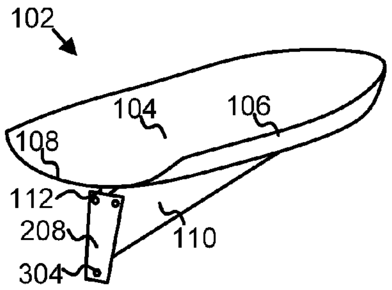
FIG. 3B is a perspective view illustrating a further embodiment of a solvent retention shelf in accordance with the present invention.

FIG. 3B is a perspective view depicting a further embodiment of the solvent retention shelf 102. The solvent retention shelf 102 includes the tray surface 104, the tray walls 106, the lip 108, the support arms 110, the shelf openings 112, a support arm face 208 and further includes solvent retention shelf connectors 304.

In the depicted embodiment, the tray surface 104 and the tray walls 106 are formed of a single material and are rounded to facilitate draining of solvent toward the lip 108. The lip 108, in the depicted embodiment, is an edge of the tray surface 104, and is not for interfacing with the inner surface 118 of the solvent sink 114. Instead, the solvent retention shelf 102, in the depicted embodiment, includes one or more solvent retention shelf connectors 304. In the depicted embodiment, the solvent retention shelf connectors 304 are holes for bolts, screws, or the like for directly connecting the support arm face 208 to the outer surface 120 of the solvent sink 114. While the depicted embodiment includes a single support arm 110, other embodiments may include two or more support arms 210.

Figure 3C:
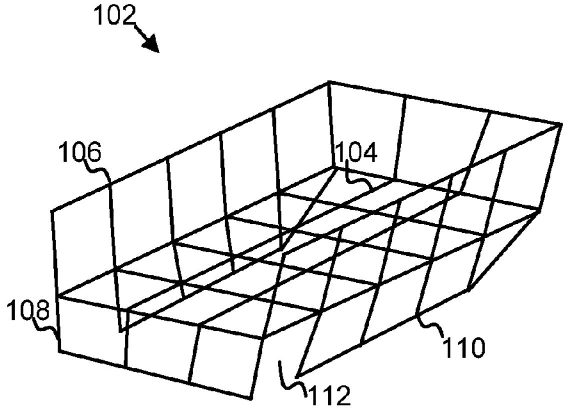
FIG. 3C is a perspective view illustrating an additional embodiment of a solvent retention shelf in accordance with the present invention.

FIG. 3C is a perspective view depicting an additional embodiment of the solvent retention shelf 102. The solvent retention shelf 102 includes the tray surface 104, the tray walls 106, the lip 108, the support arms 110, and the shelf openings 112. While the embodiments of the solvent retention shelf 102 depicted in FIGS. 1, 2, 3A, and 3B are each formed of substantially solid, continuous material, the embodiment depicted in FIG. 3C is formed of wire or rods that are bent and/or connected to form the solvent retention shelf 102.

The solvent retention shelf 102, in the depicted embodiment, allows solvent to drip or run through the tray surface 104. The solvent retention shelf 102 may be used over an additional tray, container, or the like to collect the solvent or to deliver the solvent to the solvent tank 116.

Figure 4:
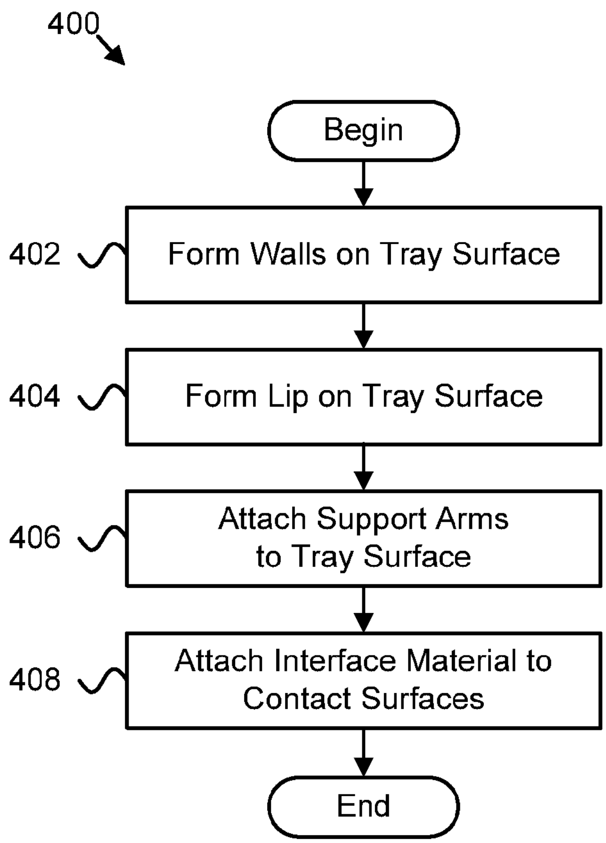
FIG. 4 is a schematic flow chart diagram illustrating one embodiment of a method for forming a solvent retention shelf in accordance with the present invention.

FIG. 4 is a schematic flow chart diagram depicting one embodiment of a method 400 for forming the solvent retention shelf 102. The method 400 begins, and a shelf assembler forms 402 the tray walls 106 on the tray surface 104. The shelf assembler may include one or more automated assembly devices, assembly workers, assembly tools, or the like. The shelf assembler may form 402 the tray walls 106 on the tray surface 104 by bending material at one or more edges of the tray surface 104, attaching the tray walls 106 to the tray surface 104, or the like.

The shelf assembler forms 404 the lip 108 on the tray surface 104. The shelf assembler may form 404 the lip 108 by bending material at an edge of the tray surface 104, attaching the lip 108 to the tray surface 104, or the like. The shelf assembler attaches 406 the support arms 110 to the tray surface 104. The shelf assembler may attach 406 the support arms 110 to the tray surface 104 by bending material at one or more edges of the tray surface 104, attaching the support arms to the tray surface 104, or the like. In one embodiment, the shelf assembler attaches 406 the support arms 110 to the tray surface 104 by interfacing the connectors 210 with the tray connector interfaces 212 and/or the support arm connector interfaces 214. The shelf assembler attaches 408 the lip interface material 204 to the lip 108 and/or the tray surface 104 and attaches 408 the support arm interface material 206 to the support arm faces 208 and the method 400 ends.

Figure 5:
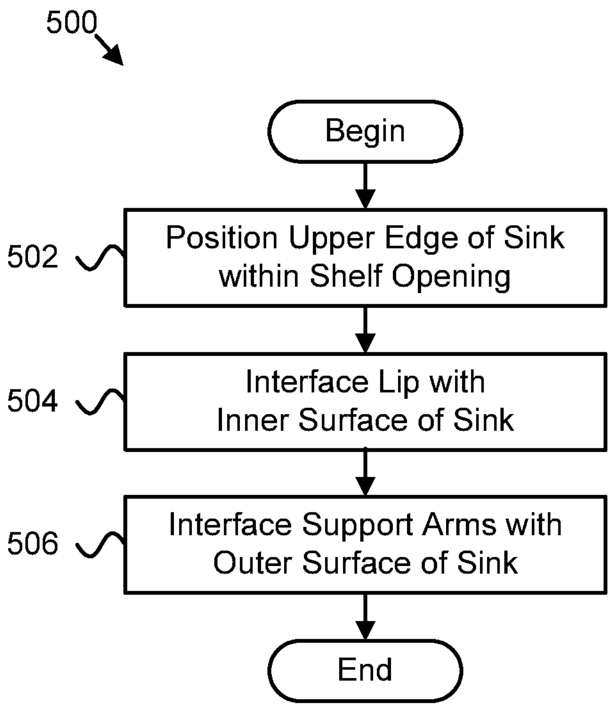
FIG. 5 is a schematic flow chart diagram illustrating one embodiment of a method for installing a solvent retention shelf in accordance with the present invention.

FIG. 5 is a schematic flow chart diagram illustrating one embodiment of a method 500 for installing the solvent retention shelf 102 on the solvent sink 114. A shelf installer positions 502 the upper edge 122 of the solvent sink 114 within the shelf opening 112 of the solvent retention shelf 102. The shelf installer may include one or more automated assembly devices, assembly workers, assembly tools, a user of the solvent sink 114, or the like. For example, the shelf installer may position 502 the upper edge 122 of the solvent sink 114 within the shelf opening 112 of the solvent retention shelf 102 by placing the shelf opening over the upper edge 122 of the solvent sink 114, or the like.

The shelf installer interfaces the lip 108 with the inner surface 118 of the solvent sink 114, for example by lowering the solvent retention shelf 102 until the lower surface of the tray surface 104 contacts the upper edge 122 of the solvent sink 122 and the lip 108 contacts the inner surface 118 of the solvent sink 122. The shelf installer interfaces 506 the support arms 110 with the outer surface 120 of the solvent sink 114, for example by rotating the solvent retention shelf 102 downward until the support arms 110 contact the outer surface 120 of the solvent sink 114. By interfacing with the inner surface 118 and the outer surface 120 of the solvent sink 114, the lip 108 and the support arms 110 cooperate to support the solvent retention shelf 102.

In some cases, the lid of the solvent sink has a flange facing downward and around the edges of the sink when in place on the solvent sink, in order to better suppress fire and further other safety objectives. In such cases, the solvent retention shelf 602 shown in FIGS. 6-10A can be used. (FIGS. 6-10A are engineering drawings showing dimensions and the like in addition to reference figures.)

Figure 6:
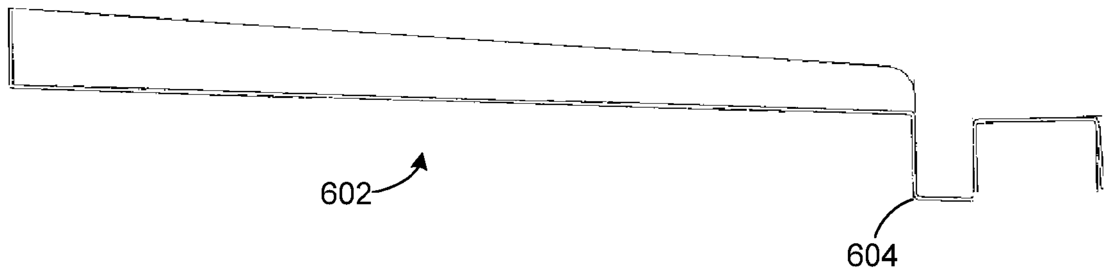
FIG. 6 is a partial side cross-sectional view of an embodiment of a solvent retention shelf in accordance with the present invention.
Figure 7:
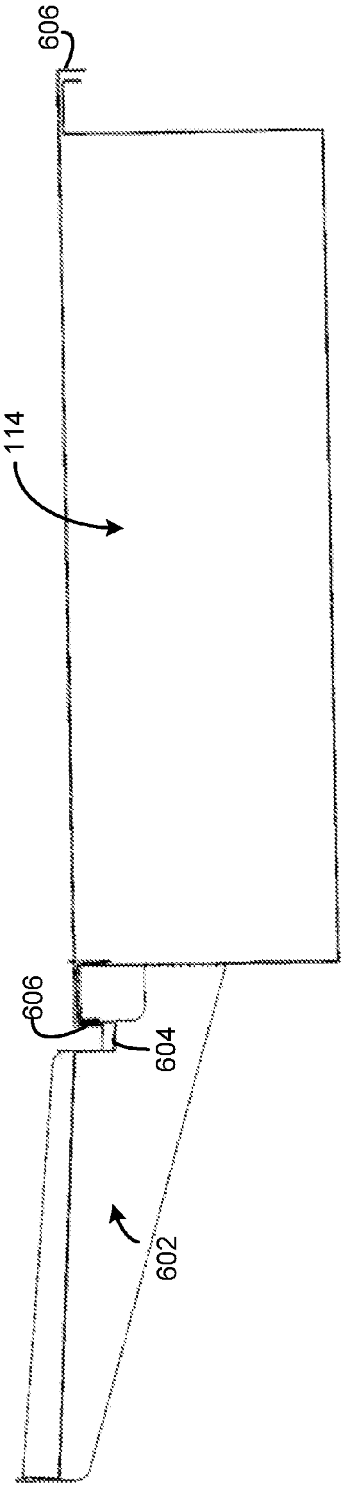
FIG. 7 is a side elevational view of the embodiment of FIG. 6 shown in use.

Referring particularly to FIGS. 6 and 7, the shelf 602 differs from the shelf 102 in that it includes an elongate trough 604, which allows for any flange 606 from the lid 135 to enter the trough 604 rather than abut the shelf 102 and prevent the lid 135 from closing completely. The shelf openings 112 of the shelf 602 may be enlarged to accommodate the flange 606, if necessary. In the depicted embodiment, the trough 604 is disposed along an edge of the tray surface 104 adjacent to the solvent sink 114. The trough 604 may be substantially parallel to an upper edge 122 of the solvent sink 114, or may otherwise be shaped to receive a flange of the lid 135 as it closes over the solvent sink 114.

Figure 8:
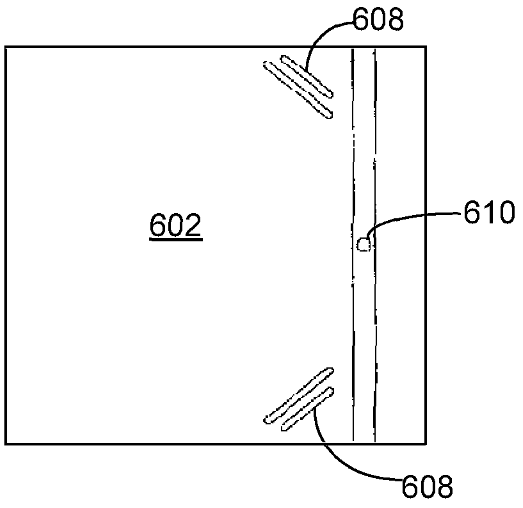
FIG. 8 is a top plan view of the embodiment of FIG. 6.
Figure 9:
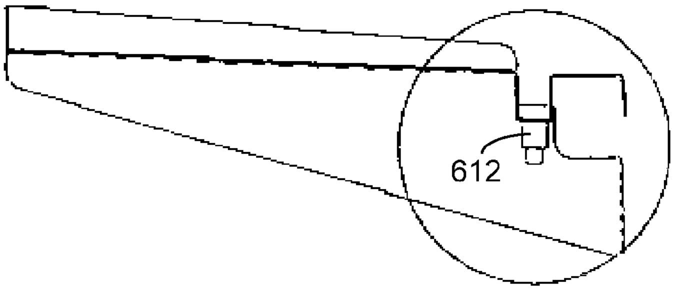
FIG. 9 is a partial side cross-sectional view of the embodiment of FIG. 6, showing a drain fitting.
Figure 9A:
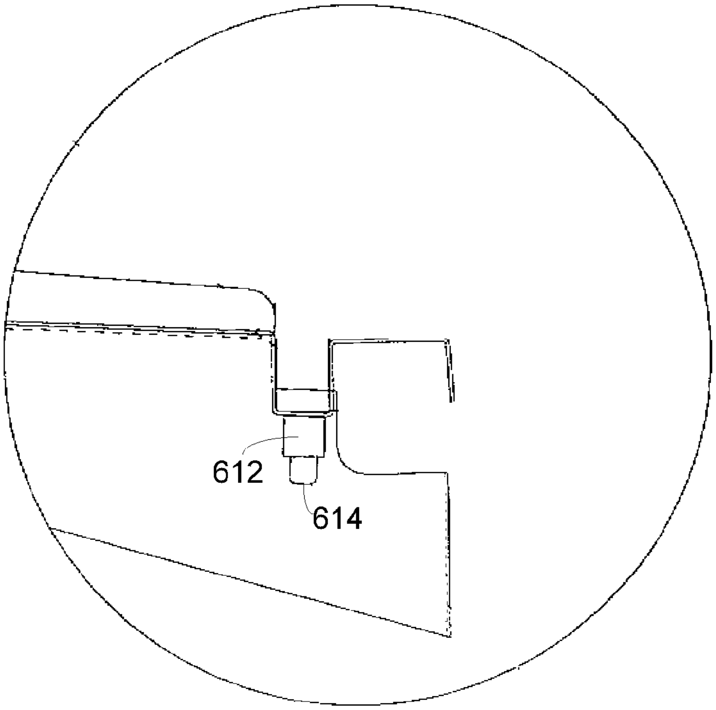
FIG. 9A is a partial side elevational view of the embodiment of FIG. 9.
Figure 10:
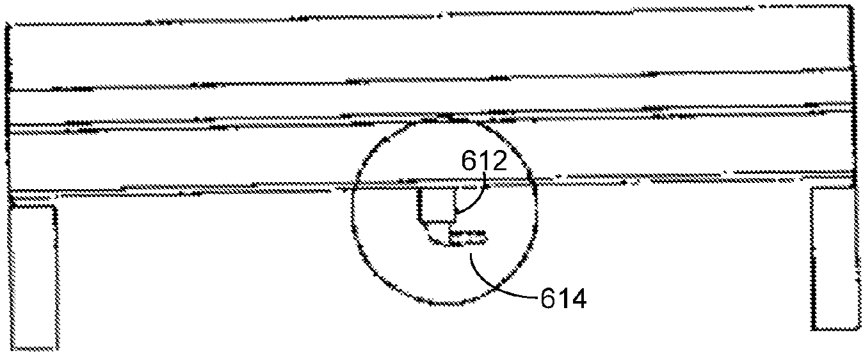
FIG. 10 is an end elevational view of the embodiment of FIG. 9.
Figure 10A:
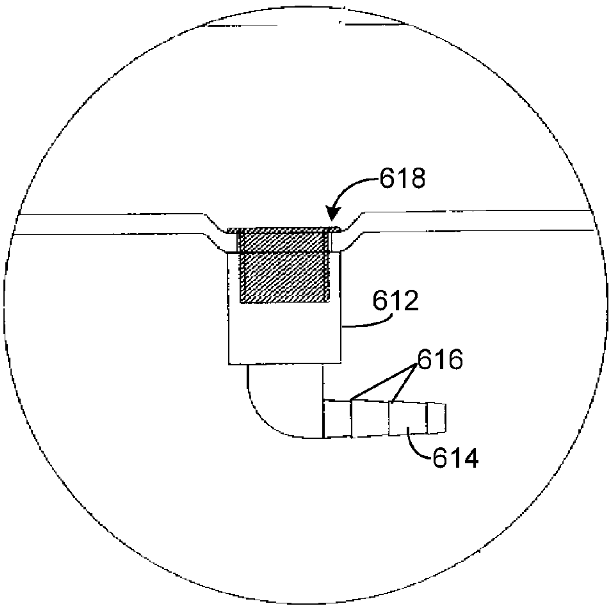
FIG. 10A is a partial end elevational view of the embodiment of FIG. 9, showing a removable waste catch screen.

Referring now additionally to FIG. 8, the shelf 602 may include diverting ribs 608 to enhance the flow of solvent from the shelf into the trough 604. It can be seen that the trough 604 interrupts the flow of solvent from the shelf 602 into the sink 114, making it desirable to collect the solvent for further use. Such collection could take place at the ends of the trough 604 or by other means, or through use of a drain hole 610 disposed in the trough 604—in the embodiment shown, it is located approximately at the midpoint of the trough 604. The trough 604 may slope slightly toward the drain hole 610 in order to urge the flow of solvent toward it rather than toward the open ends of the trough. The ends may also be closed, if desired. As shown in FIGS. 9-10A, the drain 610 may include a drain fitting 612 made of brass or other material and placed in the drain 610. The fitting 612 may be welded or otherwise affixed in the drain 610 to ensure that solvent drains through the fitting 612 and not around it.

As shown in FIGS. 10 and 10A, the fitting 612 includes an appendage 614 on which are formed ridges 616, which tend to keep a drain tube (not shown) placed on the appendage 614 from sliding off. In this way, solvent draining into the trough 604 goes through the fitting 612, appendage 614, and into the drain tube, which can be directed toward the sink 114 or directly into the tank 116, to be stored for further use.

The fitting 612 may be disposed in a depression 618. Additionally, a waste catch screen 620 may be disposed in the fitting 612 to filter out impurities from the solvent. The waste catch screen 620 may be removable for cleaning.

Figure 11A:
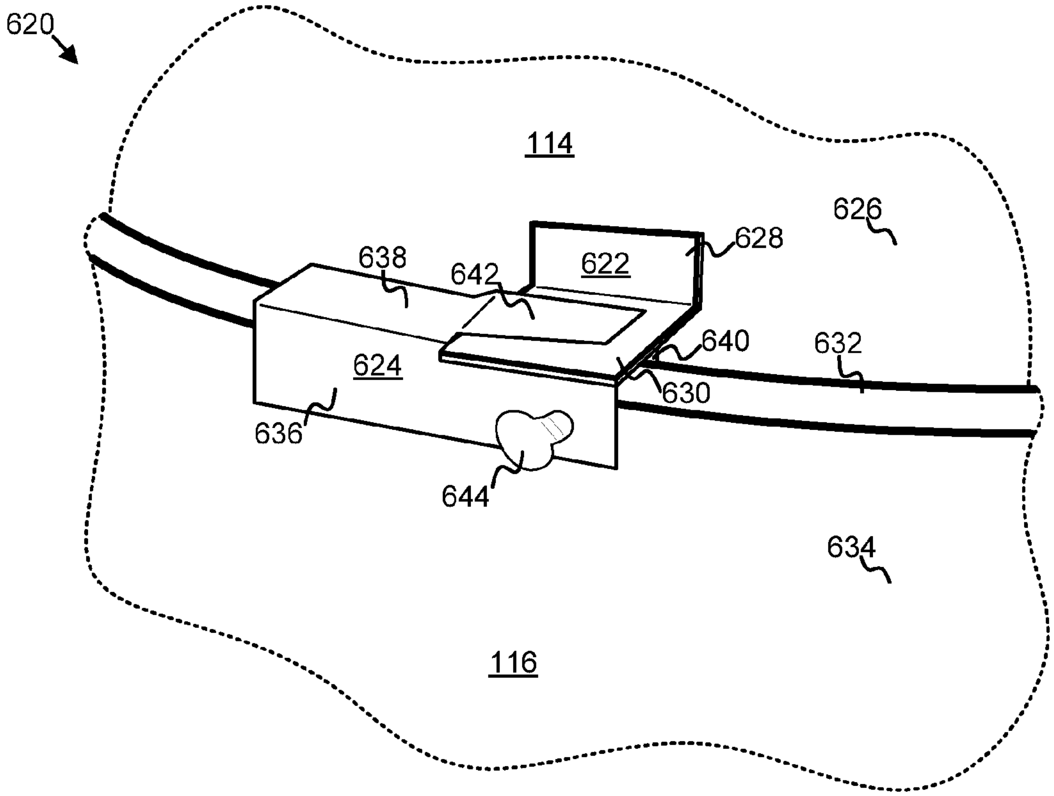
FIG. 11A is a perspective view illustrating another embodiment of a system for stabilizing a solvent sink in accordance with the present invention.

FIG. 11A is a perspective view depicting one embodiment of a system 620 for stabilizing a solvent sink 114. The system 620, in the depicted embodiment, includes a solvent sink 114 with a leveling bracket 622, a solvent tank 116, and a solvent sink clip 624. While the depicted system 620 includes a single leveling bracket 622 and solvent sink clip 624, other embodiments may include a plurality of leveling brackets 622 and/or a plurality of solvent sink clips 624. For example, in one embodiment, the system 620 includes three or more leveling brackets 622 and at least two solvent sink clips 624.

The solvent sink 114, in the depicted embodiment, includes a base portion 626. At least a portion of the base portion 626 is sized to fit within the solvent tank 116. The leveling bracket 622 extends from the base portion 626. The leveling bracket 622 may be integrated with the base portion 626 of the solvent sink 114 as a continuous piece of material or may be attached to the base portion 626 as a separate piece of material. For example, the leveling bracket 622 may be welded, screwed, bolted, or otherwise attached to the base portion 626 of the solvent sink 114. In the depicted embodiment, the leveling bracket 622 includes an attachment portion 628 that is attached to and/or integrated with the base portion 626 of the solvent sink 114 and an extension portion 630 that extends from the base portion 626 of the solvent sink 114.

The attachment portion 628 of the leveling bracket 622 mechanically supports the solvent sink 114 as the extension portion 630 of the leveling bracket 622 interfaces with the solvent tank 116. The extension portion 630, in the depicted embodiment, rests on an upper rim 632 of the solvent tank 116 to level, stabilize, and support the solvent sink 114 relative to the solvent tank 116. The upper rim 632 is an upper surface of the solvent tank 116 that interfaces with the solvent sink 114. The upper rim 632 may include a lip or other upper surface that circumscribes an upper edge of a wall 634 of the solvent tank 116, or the like. The wall 634 of the solvent tank 116 contains solvent and provides mechanical support for the solvent sink 114.

The solvent sink clip 624, in the depicted embodiment, fits over the upper rim 632 of the wall 634 of the solvent tank 116. The solvent sink clip 624 includes an outer clip wall 636, an upper clip wall 638, an inner clip wall 640, a clip extension 642, and a fastener 644. The outer clip wall 636 extends along an outer side of the wall 634 of the solvent tank 116. In the depicted embodiment, the outer clip wall 636 is substantially parallel to the wall 634 of the solvent tank 116. The inner clip wall 640 extends along an inner side of the wall 634 between the wall 634 of the solvent tank 116 and the base portion 626 of the solvent sink 114.

The upper clip wall 638 is disposed above the upper rim 632 of the solvent tank 116 extending between and connecting the outer clip wall 636 and the inner clip wall 640. The clip extension 642 extends from the upper clip wall 638 to interface with the extension portion 630 of the leveling bracket 622. The clip extension 642, in the depicted embodiment, receives the leveling bracket 622 and holds the leveling bracket 622 in a substantially fixed vertical position relative to the upper rim 632 of the solvent tank 116.

An interface between the clip extension 642 and the upper wall 638 of the solvent sink clip 624, in the depicted embodiment, prevents rotation of the leveling bracket 622 in one direction to seat the leveling bracket 622 within the solvent sink clip 624. The solvent sink clip 624 receives the extension portion 630 of the leveling bracket 622 through an opening beneath the clip extension 642 at one end of the solvent sink clip 624. The solvent sink clip 624, in certain embodiments, may slide over the extension portion 630 of the leveling bracket 622, receiving the extension portion 630 in the opening beneath the clip extension 642. The clip extension 642, in the depicted embodiment, is substantially parallel to the extension portion 630 of the leveling bracket 622.

The outer clip wall 636, the upper clip wall 638, the inner clip wall 640, and the clip extension 642 of the solvent sink clip 624, in one embodiment, are formed of a continuous piece of material. For example, the outer clip wall 636, the upper clip wall 638, the inner clip wall 640, and the clip extension 642 of the solvent sink clip 624 may be stamped or otherwise cut from a single metal sheet, may be injection molded, or the like as a continuous piece of material.

In embodiments where the outer clip wall 636, the upper clip wall 638, the inner clip wall 640, and the clip extension 642 of the solvent sink clip 624 are formed from a single metal sheet, the outer clip wall 636 and the inner clip wall 640 may be bent with a downward angle away from the upper clip wall 638. The clip extension 642 may be bent upward from the upper clip wall 638 at a first location nearest the upper clip wall 638 and bent forward at a second location so as to have a substantially parallel alignment with the upper clip wall 638 and to provide an opening to receive the leveling bracket 622.

The fastener 644 secures the solvent sink clip 624 to the solvent tank 116. In the depicted embodiment, the fastener 644 includes a threaded thumb screw that removably attaches the solvent sink clip 624 to the solvent tank 116. The fastener 644, in other embodiments, may include one or more spring clips that removable secure the solvent sink clip 624 to the solvent tank 115. For example, the outer clip wall 636 and the inner clip wall 640 may be formed of a spring metal material and may exert an inward force against the wall 634 of the solvent tank 116, or the like. Other embodiments of the fastener 644 may include a quarter-turn type fastener, a latch, a pin and receptacle, or the like. In embodiments where the upper rim 632 of the solvent tank 116 includes a lip that extends outward, away from the wall 634 of the solvent tank 116, the fastener 644 may interface with the lip of the upper rim 632 to prevent an unbalanced solvent sink 114 from lifting the solvent sink clip 624 away from the solvent tank 116.

A thumb screw fastener 644, as depicted, locks the solvent sink clip 624 in place relative to the solvent tank 116 when tightened and allows the solvent sink clip 624 to move relative to the solvent tank 116 when loosened. In certain embodiments, a thumb screw fastener 644 allows the solvent sink clip 624 to slide along the upper rim 632 of the solvent tank 116 in a partially loosened position and allows the solvent sink clip 624 to be removed from the solvent tank 116 in a further loosened position or in a fully loosened position. For example, an opening between the fastener 644 and the inner clip wall 640 may be wide enough for the wall 634 of the solvent tank 116 to pass between them in a partially loosened position, but a lip of the upper rim 632 may be too wide to pass through the opening, preventing removal of the solvent sink clip 624 in a partially loosened position. Sliding the solvent sink clip 624 along the upper rim 632 of the solvent tank 116, in certain embodiments, may simplify removal of the solvent sink 114 from the solvent tank 116 for replacing solvent, servicing the solvent sink 114, or the like.

In other embodiments, the fastener 644 may fixedly attach the solvent sink clip 624 to the solvent tank 116. For a fixedly attached solvent sink clip 624, a user may rotate the solvent sink 114 to insert the leveling bracket 622 into the solvent sink clip 624 or to remove the leveling bracket 622 from the solvent sink clip 624. For example, the fastener 644 may include one or more welds or rivets that fixedly attach the solvent sink clip 624 to the solvent tank 116; may include one or more screws, bolts, or other threaded fastener that pass through the wall 634 of the solvent tank 116 and one or more walls 636, 640 of the solvent sink clip 624; and/or may include one or more other fasteners. In a further embodiment, the solvent sink clip 624 may be integrated with the wall 634 of the solvent tank 116 and the clip extension 642 may extend from the upper edge 632 of the solvent tank 116 to receive the leveling bracket 622.

Figure 11B:
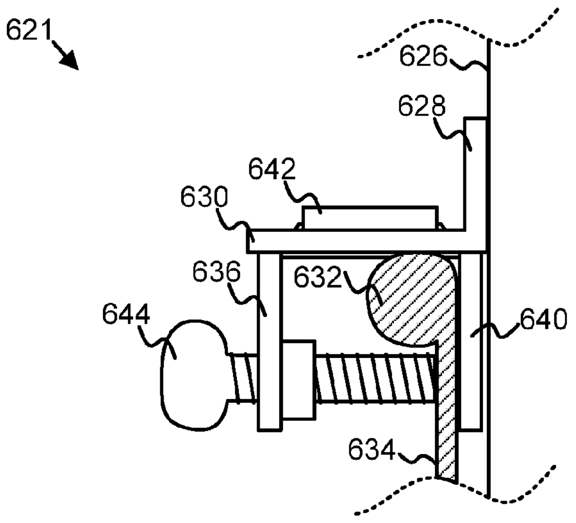
FIG. 11B is a front elevation view illustrating a further embodiment of a system for stabilizing a solvent sink in accordance with the present invention.

FIG. 11B is a front elevation view illustrating a further embodiment of a system 621 for stabilizing a solvent sink 114. The system 621, in the depicted embodiment, is substantially similar to the system 620 described above with regard to FIG. 11A. The upper rim 632 of the solvent tank 116, as depicted, includes a lip extending outward from the wall 634 of the solvent tank 116. The thumb screw fastener 644, in the depicted embodiment, passes through the outer clip wall 636 and beneath the lip of the upper rim 632 to secure the solvent sink clip 624 to the solvent tank 116.

The thumb screw fastener 644, as depicted, when fully tightened, secures the wall 634 of the solvent tank 116 between an end of the thumb screw fastener 644 and the inner clip wall 640 of the solvent sink clip 624. The inner clip wall 640 extends between the wall 634 of the solvent tank 116 and the base portion 626 of the solvent sink 114. In certain embodiments, the thumb screw fastener 644 may prevent the extension portion 630 of the leveling bracket 622 from lifting upward even when not fully tightened by interfacing with a lip of the upper rim 632 of the solvent tank 116 or the like.

As a user, objects for cleaning, or the like exert unbalanced pressure on a solvent sink 114, without one or more solvent sink clips 624, the pressure would typically lift the leveling bracket 622 away from the upper rim 632 of the solvent tank 116, causing the solvent sink 114 to become unstable. The solvent sink clip 624, using the mass and the low center of gravity of the solvent tank 116, prevents the leveling bracket 622 from lifting away from the upper rim 632 of the solvent tank 116, stabilizing the solvent sink 114. In certain embodiments, the solvent sink clip 624 is also simple to release from the leveling bracket 622 and to remove from the solvent tank 116 to allow for changing solvent or other maintenance.

Figure 12A:
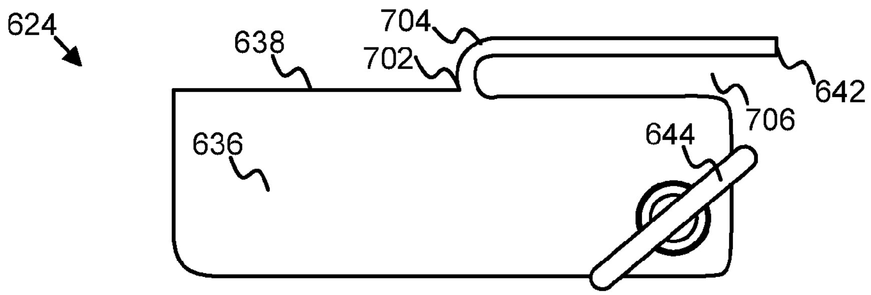
FIG. 12A is a left side elevation view illustrating an embodiment of a solvent sink clip in accordance with the present invention.
Figure 12B:
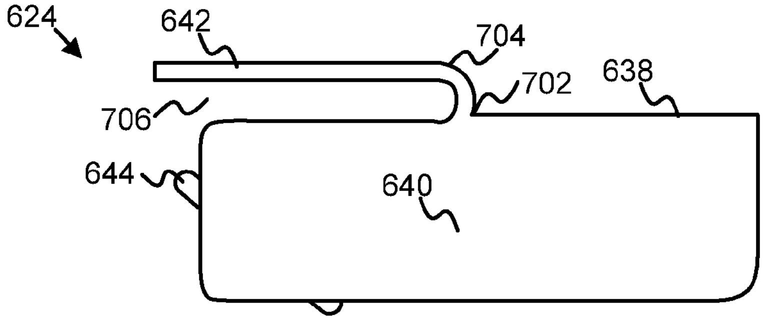
FIG. 12B is a right side elevation view illustrating another embodiment of a solvent sink clip in accordance with the present invention.
Figure 12C:
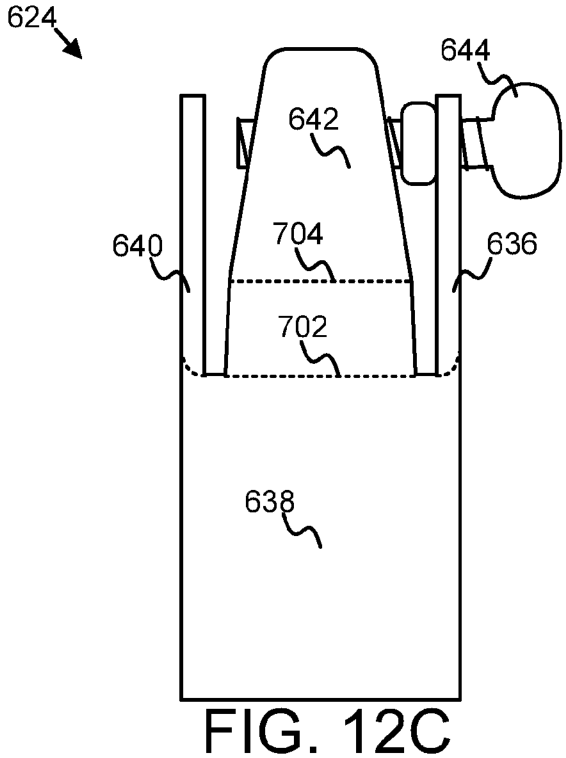
FIG. 12C is atop plan view illustrating one embodiment of a solvent sink clip in accordance with the present invention.

FIG. 12A is a left side elevation view illustrating an embodiment of a solvent sink clip 624. FIG. 12B is a right side elevation view illustrating an embodiment of a solvent sink clip 624. FIG. 12C is a top plan view illustrating an embodiment of a solvent sink clip 624. The solvent sink clip 624 depicted in FIGS. 12A, 12B, and 12C, in one embodiment, is substantially similar to the solvent sink clips 624 described above with regard to FIG. 11A and FIG. 11B.

As described above, in certain embodiments, the outer clip wall 636, the upper clip wall 638, the inner clip wall 640, and the clip extension 642 of the solvent sink clip 624 may be formed from a single continuous piece of material. For example, the outer clip wall 636, the upper clip wall 638, the inner clip wall 640, and the clip extension 642 of the solvent sink clip 624 may be cut from a sheet of stainless steel, aluminum, or the like. For example, in one embodiment, the outer clip wall 636, the upper clip wall 638, the inner clip wall 640, and the clip extension 642, which may be referred to as the clip body, are formed from a sheet of ⅛ inch steel, or the like.

In the depicted embodiments of FIGS. 12A, 12B, and 12C, the clip extension 642 is bent upward from the upper clip wall 638 at a first location 702 and bent forward at a second location 704 so as to have a substantially parallel alignment with the upper clip wall 638 and to provide an opening 706 to receive a leveling bracket 622. The outer clip wall 636 and the inner clip wall 640, as depicted, are bent with a downward angle away from the upper clip wall 638 to form an opening for receiving the upper rim 632 of the solvent tank 116.

Figure 13:
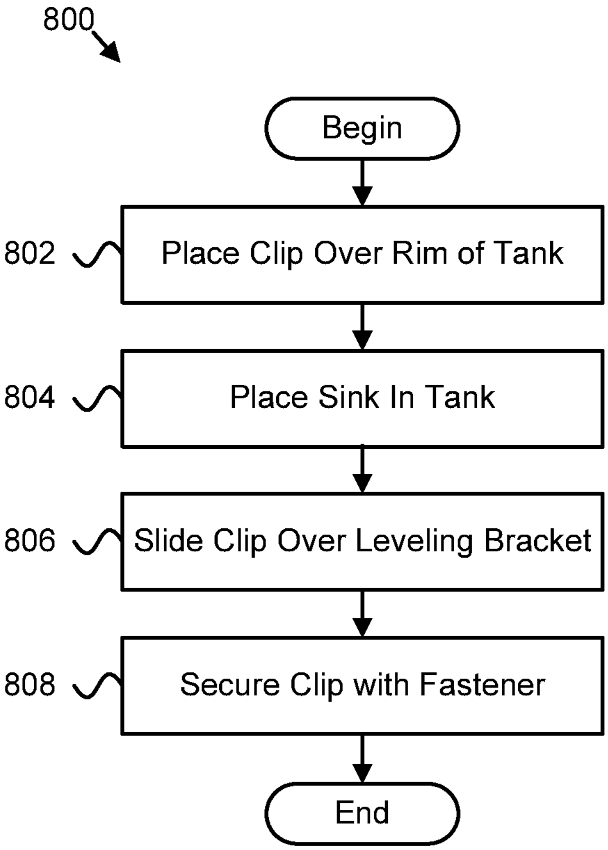
FIG. 13 is a schematic flow chart diagram illustrating one embodiment of a method for stabilizing a solvent sink in accordance with the present invention.

FIG. 13 is a schematic flow chart diagram illustrating one embodiment of a method 800 for stabilizing a solvent sink 114. The method 800 begins and a sink installer places 802 one or more solvent sink clips 624 over the upper rim 632 of a solvent tank 116. For example, the sink installer may use a solvent sink clip 624 for each leveling bracket 622 of the solvent sink 114, or the like. In one embodiment, the sink installer places 802 at least two solvent sink clips 624 over the upper rim 632 of the solvent tank 116. In another embodiment, where a single solvent retention shelf 102 is used with the solvent sink 114, the sink installer may use a single solvent sink clip 624 disposed toward an opposite side of the solvent tank 116 as the solvent retention shelf 102, or the like.

The sink installer places 804 the solvent sink 114 onto the solvent tank 116, with at least part of the base portion 626 of the solvent sink 114 extending into the solvent tank 116. The sink installer slides 806 each of the one or more solvent sink clips 624 over a corresponding leveling bracket 622. The sink installer secures 808 each of the one or more solvent sink clips 624 to the solvent tank 116 using a corresponding fastener 644 and the method 800 ends. For a threaded fastener 644, such as a thumb screw, a quarter turn fastener, or the like, the sink installer may secure 808 a solvent sink clip 624 by turning the threaded fastener 644 clockwise to tighten the threaded fastener 644.

Figure 14:
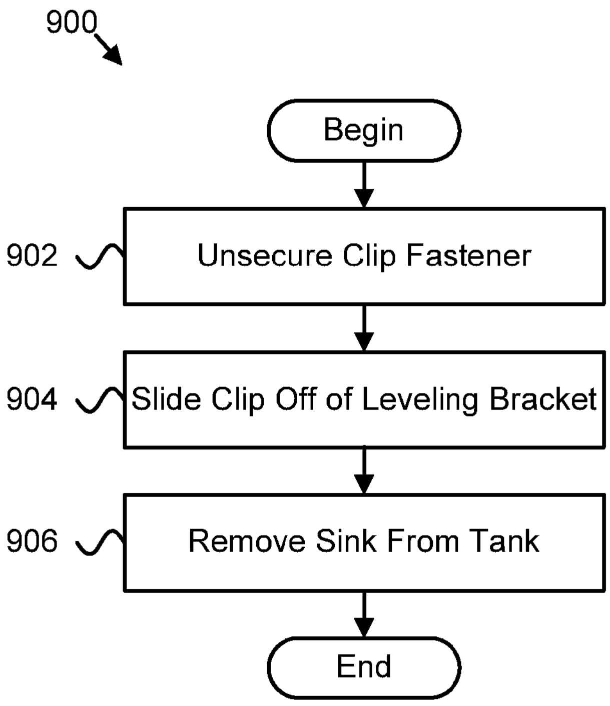
FIG. 14 is a schematic flow chart diagram illustrating one embodiment of a method for removing a solvent sink in accordance with the present invention.

FIG. 14 is a schematic flow chart diagram illustrating one embodiment of a method 900 for removing a solvent sink 114 from a solvent tank 116. The method 900 begins and a sink remover unsecures 902 one or more solvent sink clips 624 from a solvent tank 116. For solvent sink clips 624 secured using a threaded fastener 644, the sink remover may unsecure 902 the one or more solvent sink clips 624 by turning the threaded fastener 644 counter-clockwise to loosen the threaded fastener.

The sink remover slides 904 the one or more solvent sink clips 624 off of and away from each corresponding leveling bracket 622. The sink remover removes 906 the solvent sink 114 from the solvent tank 116 and the method 900 ends. In certain embodiments, the sink remover may leave the one or more solvent sink clips 624 on the upper rim 632 of the solvent tank 116 to secure and stabilize the solvent sink 114 upon reinstalling the solvent sink 114 on the solvent tank 116.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to retain solvent, the apparatus comprising:

a tray surface formed to extend outward from a solvent sink with an incline toward the solvent sink;

one or more tray walls disposed at a perimeter of the tray surface, the one or more tray walls extending upward from the tray surface;

a tray attachment interface formed to support the tray surface and the one or more tray walls relative to the solvent sink; and a removable clip comprising an outer clip wall and an inner clip wall with an upper clip wall disposed between the outer clip wall and the inner clip wall, and a clip extension extending from the upper clip wall, the inner clip wall extendable between the solvent sink and a solvent tank, the upper clip wall slidable along an upper rim of the solvent tank such that an opening beneath the clip extension receives a leveling bracket extending from the solvent sink to couple the solvent sink to the solvent tank to stabilize the solvent sink with regard to the solvent tank in response to an unbalanced pressure being exerted on the solvent sink from an object on the tray surface.

2. The apparatus of claim 1, wherein the tray attachment interface comprises a lip formed to extend from the tray surface into the solvent sink along an inner surface of the solvent sink and one or more support arms extending downward from the tray surface and formed to abut an outer surface of the solvent sink.

3. The apparatus of claim 2, wherein the tray attachment interface further comprises one or more shelf openings disposed between the lip and the one or more support arms, the one or more shelf openings formed to provide space for an upper edge of the solvent sink.

4. The apparatus of claim 2, wherein the tray attachment interface further comprises lip interface material disposed between the lip and the inner surface of the solvent sink and support arm interface material disposed between the one or more support arms and the outer surface of the solvent sink, the lip interface material and the support arm interface material each comprising padding material that provides friction between the tray attachment interface and the solvent sink.

5. The apparatus of claim 2, wherein the tray surface, the one or more tray walls, and the lip are integrally formed from a single continuous piece of material.

6. The apparatus of claim 1, further comprising an elongate trough disposed along an edge of the tray surface adjacent to the solvent sink, the elongate trough shaped to receive a flange extending from a lid of the solvent sink.

7. The apparatus of claim 6, further comprising a drain disposed within the elongate trough, the drain in fluid communication with at least one of the solvent sink and a solvent tank.

8. A system to retain solvent, the system comprising:

a solvent tank comprising an upper rim that circumscribes an upper edge of the solvent tank;

a solvent sink in fluid communication with the solvent tank, the solvent sink comprising a bracket that supports the solvent sink on the upper rim of the solvent tank;

a clip comprising an outer clip wall and an inner clip wall with an upper clip wall disposed between the outer clip wall and the inner clip wall, and a clip extension extending from the upper clip wall, the inner clip wall extending between the solvent sink and the solvent tank, the upper clip wall slidable along the upper edge of the solvent tank such that an opening beneath the clip extension receives the bracket of the solvent sink, the clip coupled to the upper rim of the solvent tank and to the bracket of the solvent sink thereby removably securing the solvent tank to the solvent sink, the clip comprising one or more fasteners that lock the clip to the upper rim of the solvent tank and to the bracket of the solvent sink; and one or more solvent retention shelves, each solvent retention shelf comprising, a tray surface extending outward from the solvent sink, the tray surface inclined toward the solvent sink;

one or more tray walls disposed at a perimeter of the tray surface, the one or more tray walls extending upward from the tray surface; and a tray attachment interface supporting the tray surface and the one or more tray walls relative to the solvent sink.

9. The system of claim 8, further comprising a drain disposed within the solvent sink and in fluid communication with the solvent tank, solvent from the one or more solvent retention shelves running from the one or more solvent retention shelves into the solvent sink, through the drain, and into the solvent tank.

10. The system of claim 8, further comprising a solvent pump and one or more solvent hoses, the solvent pump delivering solvent from the solvent tank to the solvent sink through the one or more solvent hoses.

11. The system of claim 10, further comprising a solvent filter between the solvent tank and the solvent pump, the solvent filter removing contaminants from the solvent that the solvent pump delivers from the solvent tank to the solvent sink.

12. The system of claim 8, further comprising a lid of the solvent sink.

13. The system of claim 12, further comprising a fusible material supporting the lid in an open position, the fusible material melting to close the lid in response to a fire in the solvent sink.

14. The system of claim 12, wherein each solvent retention shelf further comprises an elongate trough disposed along an edge of the tray surface adjacent to the solvent sink, the elongate trough shaped to receive a flange extending from the lid of the solvent sink.

15. The system of claim 8, wherein the tray attachment interface comprises a lip extending from the tray surface into the solvent sink along an inner surface of the solvent sink and one or more support arms extending downward from the tray surface and abutting an outer surface of the solvent sink.

16. The system of claim 8, wherein the one or more solvent retention shelves are removable from the solvent sink and are installable in a plurality of positions around the solvent sink.

17. A method for forming a solvent retention shelf, the method comprising:

forming one or more tray walls at a perimeter of a tray surface formed to extend outward from a solvent sink, the tray walls extending upward from the tray surface;

forming a lip on the tray surface, the lip extending downward from the tray surface on one edge of the tray surface;

attaching one or more support arms to the tray surface, the one or more support arms extending downward from the tray surface, the lip and the one or more support arms forming one or more shelf openings;

attaching a clip to the solvent sink to couple the solvent sink to a solvent tank to stabilize the solvent sink with regard to the solvent tank in response to an unbalanced pressure being exerted on the solvent sink from an object on the tray surface, the clip comprising an outer clip wall and an inner clip wall with an upper clip wall disposed between the outer clip wall and the inner clip wall, and a clip extension extending from the upper clip wall, the inner clip wall extending between the solvent sink and the solvent tank; and sliding the upper clip wall along an upper rim of the solvent tank such that an opening beneath the clip extension receives a leveling bracket extending from the solvent sink.

18. The method of claim 17, further comprising placing the one or more shelf openings over an upper edge of a solvent sink.

19. The method of claim 18, further comprising interfacing the lip with an inner surface of the solvent sink.

20. The method of claim 19, further comprising interfacing the one or more support arms with an outer surface of the solvent sink such that the tray surface extends outward from the solvent sink and the tray surface is inclined toward the solvent sink, the lip and the one or more support arms supporting the tray surface and the one or more tray walls relative to the solvent sink.

* * * * *